United States Patent [19]

Ts'Ao

[11] 4,275,273

[45] Jun. 23, 1981

[54] TELEPHONE INDEX FOR REPERTORY DIALER

[76] Inventor: Si-Ling Ts'Ao, 39-1 Alley 30, Lane 172, Section I, Keelung Rd., Taipei, Taiwan

[21] Appl. No.: 10,375

[22] Filed: Feb. 8, 1979

[51] Int. Cl.³ .................................... H04M 1/274
[52] U.S. Cl. ........................ 179/90 B; 179/90 CS; 179/90 BD; 340/365 VL; 340/147 A
[58] Field of Search ........... 179/90 B, 90 BD, 90 BB, 179/90 CS; 340/147 A, 365 VL

[56] References Cited

U.S. PATENT DOCUMENTS

| T966,005 | 1/1978 | Gillette | 179/90 B |
|---|---|---|---|
| 2,995,726 | 8/1961 | Rickard | 340/147 A |
| 4,164,630 | 8/1979 | Brodbeck | 340/147 A |

FOREIGN PATENT DOCUMENTS

| 1214899 | 12/1970 | United Kingdom | 179/90 BD |
|---|---|---|---|
| 1219547 | 1/1971 | United Kingdom | 179/90 B |
| 1442887 | 7/1976 | United Kingdom | 179/90 B |

*Primary Examiner*—Gerald L. Brigance
*Attorney, Agent, or Firm*—Robert F. O'Connell

[57] ABSTRACT

A repertory dialer having a greater telephone number dialing capacity than the number of its selection buttons has each button selectively associated with more than one name. Actuation of a selected button will automatically dial the telephone number of the name which is associated with the button at the time of actuation. The names and corresponding telephone numbers are each formed into groups with each selected group of names having a name selectively associated with each selection button and with either manual or automatic electrical switching to cause the group of telephone numbers corresponding to the selected group of names to be operatively connected with the selection buttons.

9 Claims, 12 Drawing Figures

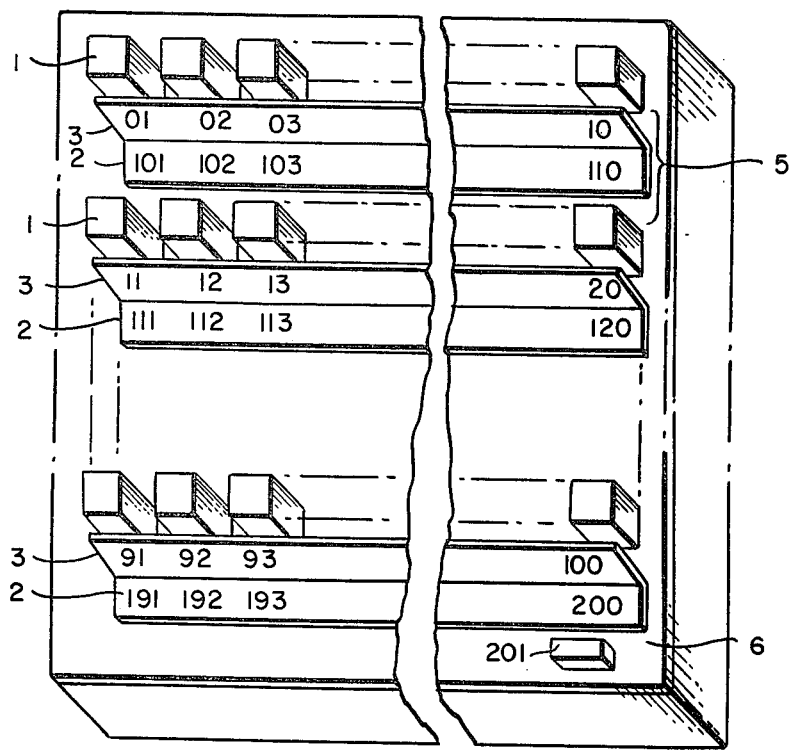
FIG.1
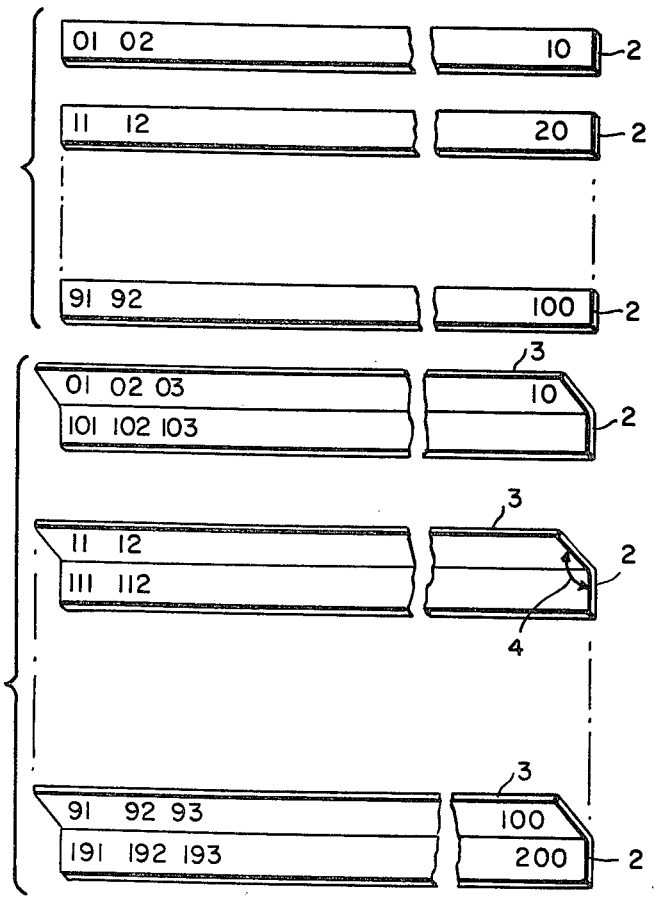
FIG.2 PRIOR ART
FIG.3

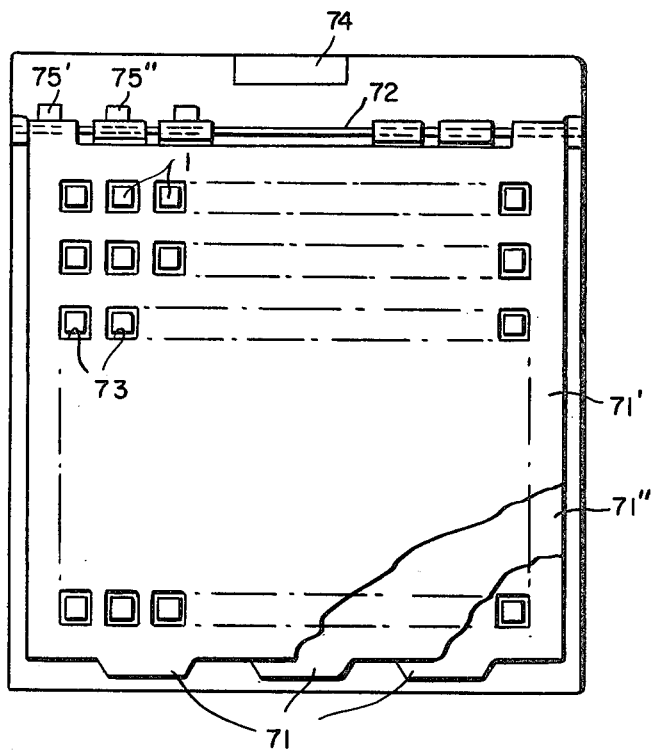
FIG.6
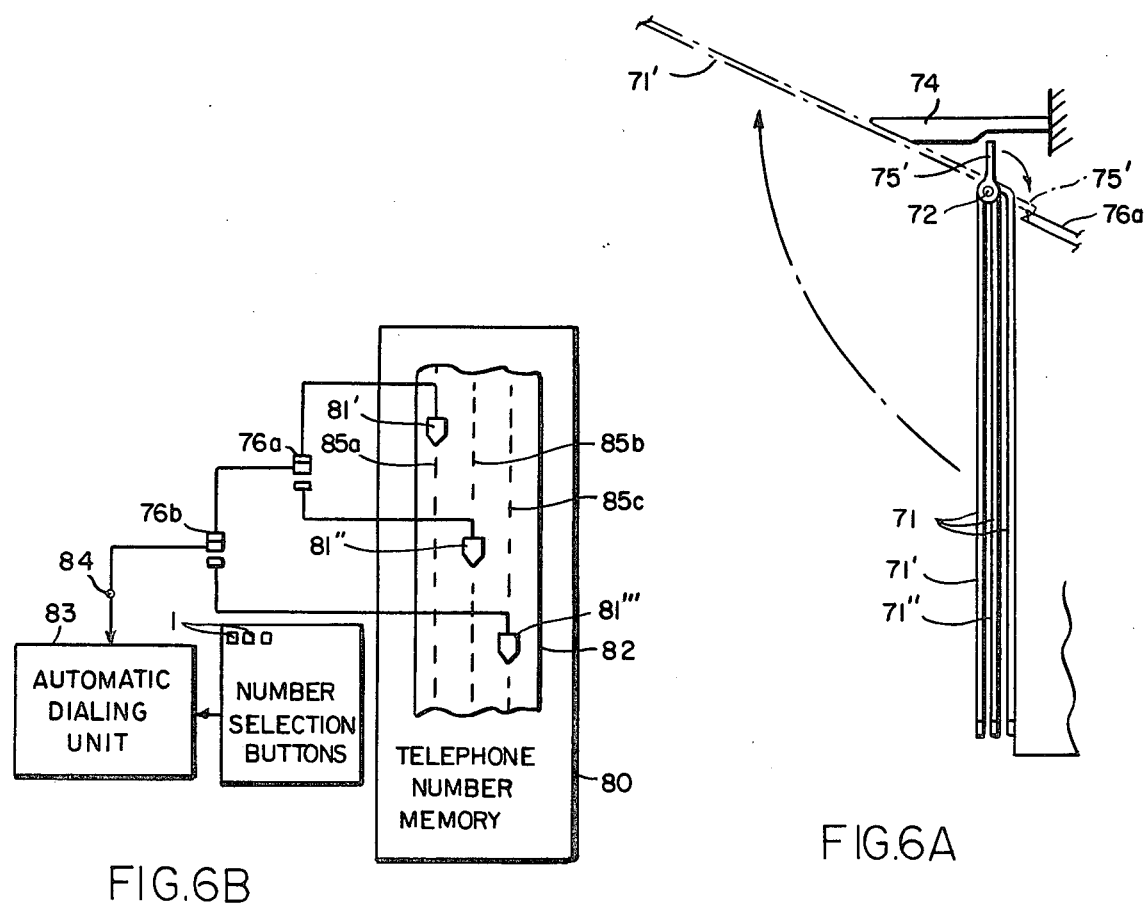
FIG.6B
FIG.6A

TELEPHONE INDEX FOR REPERTORY DIALER

BACKGROUND OF THE INVENTION

This invention relates to the telephone index used with telephone automatic calling devices such as telephone repertory dialers.

Telephone repertory dialers are subscriber's telephone sets in which frequently called telephone numbers may be stored. During use, the subscriber needs to push one or a few buttons only to initiate the call instead of "dialing" all digits of the said telephone number. Therefore, they are very convenient for subscribers. However if the capacity of the dialer is large, for instance accommodating more than 100 frequently called telephone numbers, the subscriber will have difficulty remembering each abbreviated number of those telephone numbers. This may be one of the main reasons why no large capacity telephone repertory dialers of the push button type are found on the market. Telephone repertory dialers of large capacity are very useful to many businessmen because they need to call many of the same customers frequently. The telephone indices described herein will eliminate the need for the subscriber remembering the abbreviated numbers of all stored telephone numbers.

This invention describes various telephone indices. Different methods of indexing may be used for different capacities of the dialers. For a small capacity dialer, the name corresponding to a frequently called telephone number is generally written adjacent to the button representing it. For dialers of large capacity, this method will occupy too large a space. The telephone indices of this invention will describe apparatus and methods of placing names of frequently called telephone numbers on strips of paper, which may be put upon the dialer in different ways without occupying large table space, and the physical size of the dialer need not be materially increased over a smaller capacity dialer. The location of the desired repertory button representing the required telephone number may be found simultaneously with the operation of the dialer. This means that no additional operation will be required such as referring to different strips of paper of the telephone index, thereby also saving much time.

The main object of the invention is to provide several forms of telephone indices which are simple in construction, compact in space, simple in operation, and in which it is easy for the subscriber to find the particular repertory button representing the telephone number wanted.

Another object of the invention is to incorporate such forms of automatic telephone indices in dialers of large capacity so that the desired repertory button may be found simultaneously by the subscriber during initiation of the telephone call without an additional operation being required.

THE FIGURES

The above features and objects will be easily understood with the following description and drawings.

FIG. 1 shows the repertory button array of a dialer of large capacity.

FIG. 2 shows strips of paper for printing numerals of repertory buttons and writing the corresponding names of frequently called telephone numbers.

FIG. 3 shows two strips of paper mounted in an angle so that both may be read by the subscriber.

FIG. 6 is an isometric view of a third automatic telephone index.

FIG. 6A is a side view of the index of FIG. 6.

FIG. 6B is a pictorial view of the switching mechanism and automatic dialer mechanism used in conjunction with FIG. 6.

DETAILED DESCRIPTION OF THE INVENTION

FIG. 1 shows the repertory buttons 1 arranged in rows and columns in an automatic dialer of large capacity such as described in FIG. 2 of my U.S. Pat. No. 3,988,550. Each repertory button 1 is used to control one of the frequently called telephone numbers. The number of buttons 1 in rows and columns may be any number according to the capacity of the dialer, but in FIG. 1 and hereafter ten buttons are used in each row and column for ease of explanation.

Figure 4:
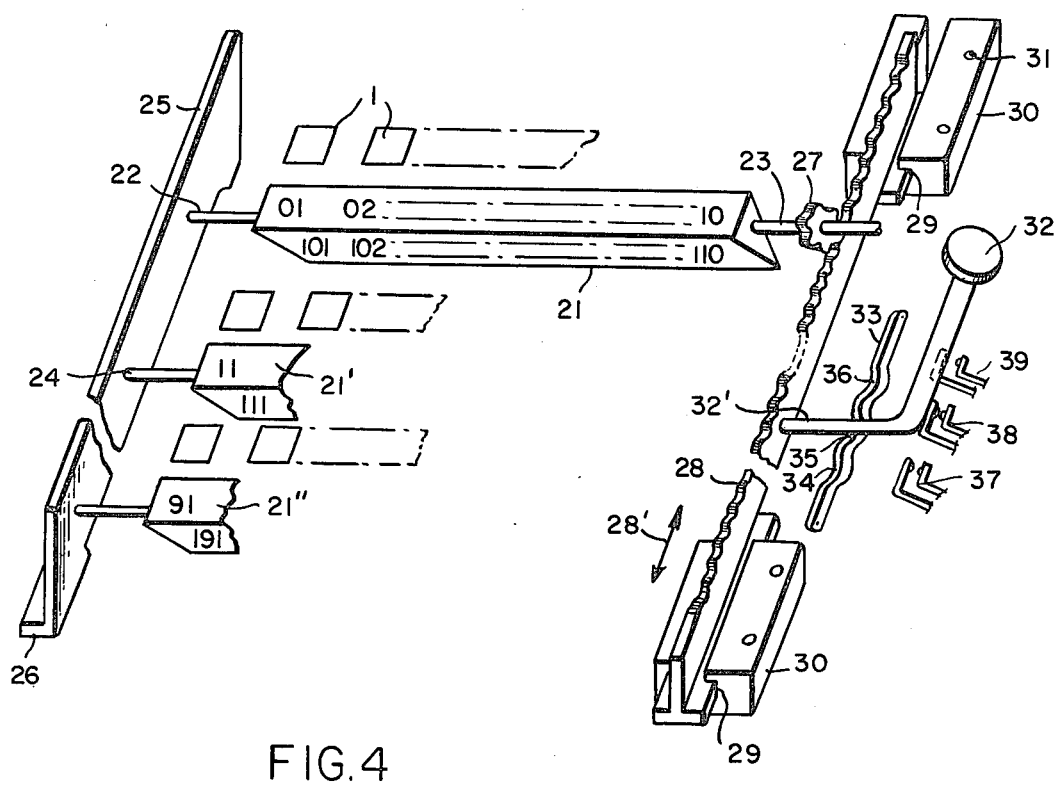
FIG. 4 is an isometric view of an automatic telephone index.
Figure 5:
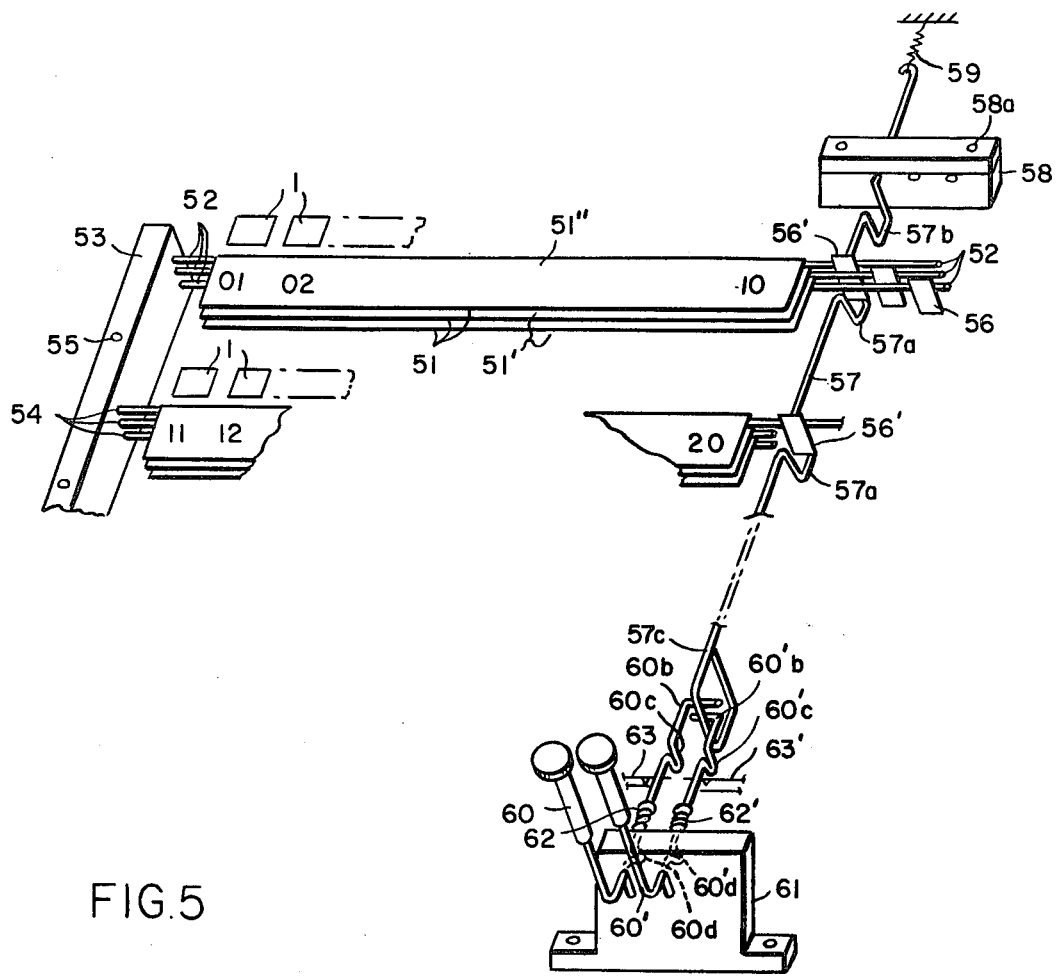
FIG. 5 is an isometric view of another automatic telephone index.

The space 5 between the rows of buttons 1 of the cover plate 6 of FIG. 1 is either occupied by strips of paper 2, 3 (as shown) of FIGS. 2 and 3, or is a transparent region, or an opening in plate 6 for viewing the support 21 of FIG. 4, or is occupied by the strips 51 of FIG. 5. In each case, the space 5 contains those names whose telephone numbers are frequently called as will be explained in detail subsequently.

In FIG. 2 several strips of paper 2 upon which numerals representing the numbers of the repertory buttons may be printed in a suitable color as shown by 01, 02, . . . 10 and etc. The names of subscribers of frequently called telephone numbers are written upon the same strips of paper 2 and placed between rows of buttons 1 with each subscriber's name adjacent to each button representing it. During operation, it is only required to locate the particular button corresponding to the desired subscriber and push it to initiate the call as described in U.S. Pat. No. 3,988,550. In such a dialer, the required button may be easily located if the names of the subscribers are arranged in good alphabetical order. In this type of dialer, the capacity of the dialer is equal to the number of buttons.

If the capacity of the dialer is increased to 200 buttons, for instance, it might be inconvenient to use such a large number of buttons. If a 10×10 array of 100 repertory buttons are desired, 200 telephone numbers may be grouped into two groups: the first group represents the telephone numbers from 01, . . . 100; and the second group numbers from 101, . . . 200. Then the telephone index may consist of 20 strips of paper. There are ten strips of paper 2, as in FIG. 2, which may be laid flat between rows of buttons. The other ten strips of paper, identified as 3 in FIG. 3, which may be printed in suitable contrasting colors each with ten numerals 101, 102, . . . 200. Each strip 3 is mounted with its corresponding strip 2 in an angle 4 of about 100 degrees.

Therefore the strips 3 are mounted almost vertically. The stems of the buttons are preferably made of transparent material so that both strips 2 and 3 may be easily read by the subscriber even though they are between rows of buttons. Now each button represents two names and two corresponding telephone numbers. If the dialer uses a magnetic tape for storing telephone numbers, as in U.S. Pat. No. 3,988,500, incorporated herein by reference, there will be two recording tracks. One track is used to store all telephone numbers designated and represented by buttons from 01, 02, 03, . . . 100; while the other track is used to store all telephone numbers also represented by buttons 01, 02, . . . 100. Normally the first track contains the more frequently called numbers and is most used. When any button is pushed, the desired telephone number will be extracted from the first track on the tape and sent out from the caller's telephone set to initiate the call. If the second track is to be used, the read-write magnetic head may be moved from the first track to the second track by first pushing a group button 201 (see FIG. 1) or the second track circuit of a multi-track read-write head is connected into the operating circuit by pushing this group button. Such a mechanism is well known in the art of recording and playback of tapes and is not shown here. The group button may also be used to select integrated circuit memory chips instead of a magnetic tape if memory chips are used for storing the telephone numbers. The telephone number selection circuits are also well known in the art and are not further described. By the method and apparatus described above, a telephone number in a dialer of medium capacity of 200 telephone numbers may be easily found if the names of frequently called persons are alphabetically written upon the two groups of strips of paper 2, 3, respectively, without materially increasing the physical size of the dialer.

Figure 4A:
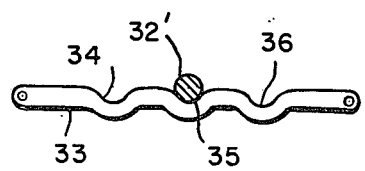
FIG. 4A is a detailed view of the detent mechanism of FIG. 4.

For a dialer of larger capacity, for example 300 telephone numbers, a telephone index of the design shown in FIG. 4 may be used. Strips of paper printed with the numerals 01, 02, . . . 10; 101, 102, . . . 110; and 201, 202, . . . 210, respectively, are glued upon each face of the triangular support 21. There are ten such triangular supports 21 corresponding to ten rows of buttons, although only one is shown in FIG. 4. A cover plate 6, not shown in FIG. 4 for clarity, has a transparency or opening between the rows of buttons in order that the names on support 21 may be seen. Upon the adjacent triangular support 21' (partially shown) are glued strips of paper printed with 11, 12, . . . 20; 111, 112, . . . 120; and 211, 212, . . . 220, and similarly for the remaining eight triangular supports. Extending from each end of each triangular support 21 are rods 22 and 23 which may be mounted in the holes 24 of supporting plates 25, one plate 25 on each end of the triangular support 21, although only one is shown in FIG. 4 for simplicity. The holes 24 do not extend through the plate 25, therefore the supports 21 are kept between the two plates 25 without leftward or rightward movement. Each plate 25 has an angle portion 26 for mounting plate 25 upon a main base plate of the dialer, not shown in FIG. 4. All ten triangular supports 21 are mounted in parallel and spaced and inserted between the rows of buttons 1 without interference of each other or the buttons. A pinion 27 is rigidly fixed upon round end rod 23. Ten pinions 27 one for each of the ten triangular supports 21 engage one rack bar 28 which has an inverted T portion 29 at each end. The supporting plates 30 have an inverted T slot 29 to guide the rack bar 28 so that the rack bar 28 can only more longitudinally along direction 28'. Each supporting plate 30 has two holes 31 through which it may be bolted to the main base plate (not shown) of the dialer. An "L" shaped lever 32 is mounted at a suitable position on the rack bar 28. The subscriber may move the rack bar longitudinally forward or backward by moving the lever 32. The lower portion 32' of the lever 32 makes contact with a longitudinally extending resilient wire or spring 33 which is mounted upon and parallel to the main base plate of the dialer and parallel to the rack bar 28. The action of lower portion 32' upon the spring 33 may be best seen in FIG. 4A which shows their partial sectional view. The spring 33 has three indented portions 34, 35, and 36. When the lower portion 32' of the lever 32 is moved longitudinally into the indented portions, the rack bar 28 rotates all ten pinions 27 and thereby the ten triangular supports 21 to cause their faces to be upward for viewing. Therefore, when the portion 32' of the lever 32 is in the indented portion 34 of the spring 33, all ten strips marked with the names 01, 02, . . . 10; 11, 12, . . . 20; 21, 22, . . . 100 face upward. The subscriber may now look at those strips upon which the names of frequently called telephone numbers in the first group are already written. The repertory buttons from 01, 02, . . . 100 represent 100 telephone numbers in the first group. When any telephone number in the second group of 100 telephone numbers needs to be called, the subscriber moves the handle 32 longitudinally to cause portions 32' to rest upon the indented portion 35. The rack bar 28 rotates all ten triangular supports 21 so that the names in the second group will face upward. Now the same 100 repertory buttons are used to represent the 100 telephone numbers in the second group.

There are three sets of contact springs 37, 38, and 39. When the lever 32 is at the indent portion 34, only the one set of spring contacts 37 is closed which thereby closes the operating circuit to the first track of a read-write head (not shown). In this case, when any button is pushed to initiate a call, only the signals recorded upon the first track of the tape are searched for correspondence to the selected button and the dialing signal for that button extracted. Or only the dialing signals stored in the first group of integrated circuit memories is extracted and sent out to initiate a call if this form of memory is used. If the caller wants to initiate a call in the third group, he moves the lever 32 to the indent portion 36. By doing so, all 100 names in the third group on support 21 are upward and the user may locate the desired repertory button 1. Lever 32 at indent portion 36 also closes the spring contacts 39 to connect the read-write head of the third track of the magnetic tape which will provide a dialing signal as described previously upon the selection of a button 1.

For other larger capacity dialers, the support 21 may be square to present four faces, instead of being triangular, and generally may have as many sides as space limitations permit. The number of detents and switches are correspondingly increased.

Figure 5A:
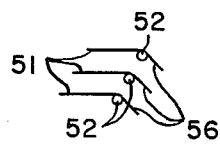
FIG. 5A is a side view of the strips and tabs of FIG. 5.
Figure 5B:
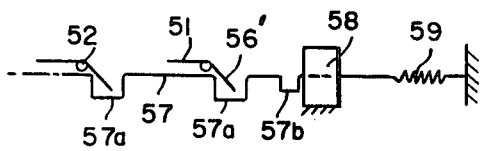
FIGS. 5B and 5C show the two positions of a rigid rod and the resulting change in position of the strips and tabs shown in FIG. 5.
Figure 5C:
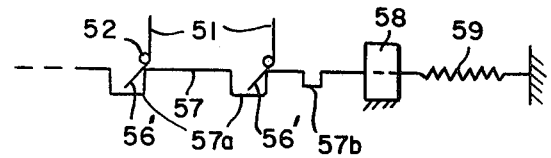

Another automatic telephone index, shown in FIG. 5, may be used for very large capacity dialers. A thin support strip 51 of suitably stiff material is rigidly attached to a round rod 52. The names of frequently called telephone numbers may be written on paper and glued to the strips 51. Several strips 51 may be laid horizontally one upon the other to form a pile of strips which are rigidly attached to their respective rods 52 rotatably supported in holes 54 of end supports 53, one support 53 on each side, but only one is shown in FIG. 5. The holes of 54 are only partially through supports 53 so that the strips 51 are without sideward movement. Supports 53 have mounting holes 55 to attach them to the base plate of the dialer not shown. On the right end of the rod 52, there is rigidly attached a downwardly directed narrow tab 56. The tabs 56 and associated rods 52 attached to strips 51 of different layers should not be the same vertical plane in order to provide clearance for a substantially 90° rotation of each strip. FIG. 5A shows the side view of strips 51, rods 52, and tabs 56 of a row (pile 51′) where each rod 52 is displaced from the rod above it so that when it rotates substantially 90° its attached horizontal strips 51 may assume a vertical position before making contact with the rod 52 above it. Piles 51′ of strips 51 are located next to their corresponding rows of repertory buttons 1. The names corresponding to the telephone numbers in the first group are on the ten strips of the top layer. All ten strips 51 in the top layer 51″ of the ten groups have their tabs 56′ engage one rigid multi-U shaped rod 57 which is slidably guided and prevented from rotating by two supports 58, near each end of the rod, only one support 58 is shown in FIG. 5. Supports 58 are mounted on the same base plate of the dialer through holes 58a. The action of the rigid rod 57 upon the tabs 56′ may be best seen in the functional drawings of FIGS. 5B and 5C. Terminal spring 59 causes the ten U bends 57a of each rod 57 pull the tabs 56′ to the right to cause the thin name strips 51 to lie horizontally because the rigid rod 57 is pulled by the spring 59 until a small U bend stop 57b just touches the support 58. At the other end of the rod 57, there is a loop 57c. A lever 60 has a bend 60b to engage the loop 57c. Normally a spring 62 pushes the lever 60 inward against support 61. When the lever 60 is pulled out, it pulls rigid rod 57 forward by engaging the loop 57c with hook 60b. Now the ten U-bends 57a of rod 57 turn all ten tabs 56′ and ten strips 51 to the vertical position as shown in FIG. 5C. On the underside of the ten strips 51 of the top layer, there are glued the names corresponding to the telephone numbers in the second group. The subscriber may look at those vertically oriented strips for the second group of names next to their corresponding repertory buttons. The handle 60 has a bend 60C. When the handle 60 is pulled out, bend 60c closes a pair of switch contacts 63, one pair of contacts for the bend 60C of each rod 57, but only one is shown in the FIG. 5. The action of switch contacts 63 in controlling the number dialled is the same as that of switch 37, 38, or 39 of FIG. 4 as explained earlier. All the names corresponding to telephone numbers in the third group are written upon the top of ten strips 51 in the second layer. If one wants to look upon those, one just pulls another lever 60′ which has also a hook 60b′ to engage the same loop 57c of the same rod 57 as engaged by hook 60b. Its operation of rotating the ten strips 51 of the top layer is the same as described before for lever 60 but it closes another circuit comprising switch contacts 63′ to select another track on the tape. The strips 51′ in the second layer are turned to the vertical by a second strong multi-U bend rod and lever (not shown) of a similar design. For simplicity, these additional rods and levers are not shown in FIG. 5. An automatic locking device to lock the selected lever 60 in the forward or activating position, as by bend 60d, should be provided. Such locking devices are conventional mechanical devices and well-known to those skilled in the art. When a lever is pulled forward, it releases a previous engaged lever automatically. In order to avoid confusion in the drawing, it is not shown but again such mechanically interlocked devices are well known. The cover plate 6 (not shown for clarity) is far enough above or has openings in the regions 5 between the rows of buttons to allow the strips 51 to assume a vertical position without interference by the cover plate 6.

FIG. 6 shows another embodiment of the automatic telephone index. It consists of piles of several large thin sheets 71. One end of each sheet is hinged to one common shaft 72 mounted horizontally on the dialer. There are many small holes 73 in the sheets 71 just large enough for the rows and columns of the repertory buttons 1 to go through when the sheet is laying flat in a pile on the dialer, without interferring with the operation of any button. The names corresponding to telephone numbers in the first group are written on the top sheet adjacent to each corresponding repertory button. When the subscriber wants to make a telephone call to a name in the first group, he finds the name on the first sheet and pushes the button next to the name. The call will be initiated on the first track of tape and completed as stated in U.S. Pat. No. 3,988,550. If the user wishes to make a call to a telephone number in the second group, the first sheet 71′ is turned upward to let it rest against a back stand 74 as can be seen in FIG. 6A. At that position, the extension tail 75′ of the first sheet 71′ will come in contact with and operate a switch 76a, thus automatically putting the second track on the tape into the operating circuit. The caller then may push the button corresponding to the name to be dialled written on the second sheet 71″. FIG. 6B shows a switching circuit connection for selecting tracks. When all the thin sheets 71 are laid flat on the dialer, the output terminal 84 is connected through switches 76a and 76b to the first track 85a by magnetic pick up head 81′. When the first sheet 71′ is turned upward, its extension tail 75′ causes the switch 76a to switch and connect the output 84 to the second track 85b. Similarly the extension tail 75′ of the second sheet will push the switch 76b to connect the output 84 to the third track 85c. The output 84 is connected to the automatic dialing circuitry 83 which is described in my patent referred to earlier in the specification. The telephone storage tape 82 on which the telephone numbers are stored on tracks, also described in my patent for a single track. Therefore, the output from the memory unit 80 is selectively transmitted through the memory group selection switches 76 to the automatic dialing mechanism 83.

Although the automatic dialing mechanism 83 and the telephone number group storage 80 are shown in conjunction with switches associated with FIG. 6, it is apparent that the switches shown in FIGS. 1, 4, and 5 may be similarly connected to the magnetic heads 81 of tracks 85 to provide the desired groups of telephone numbers. Different memory groups are selectively obtained when the memory group selection switches are selectively energized. The modifications to the switching circuitry of FIG. 6B required for the other figures will be apparent to those skilled in the art especially in view of the detailed description of the operation of FIGS. 1, 4, and 5 provided in this application.

I have disclosed several forms of telephone indices. These indices may be incorporated into dialers of very large capacity to eliminate the need by the subscriber either to remember a great number of numerals representing frequently called telephone numbers or to look for the repertory button number in many sheets of a telephone index before the operation of the dialer. The required switching of the dialer to the desired number memory group and the selection of the corresponding index sheet may be carried out simultaneously as disclosed in the preferred embodiment of this invention without the subscriber doing any other operation. Similar mechanisms may be devised by those skillful in such art including manual operation of switches to select the telephone number memory group corresponding to the selected index sheet prior to actuation of the button of the dialer. Therefore, my invention should not be limited to those disclosed but is intended to include equivalents thereto.

What is claimed is:

1. Apparatus for indexing the repertory buttons of a telephone repertory dialer comprising:
   a plurality of telephone number selection buttons arranged in rows and columns,
   means for storing first and second groups of a plurality of telephone numbers, one number of each group of said plurality of telephone numbers corresponding to a particular selection button,
   means for displaying first and second groups of names corresponding to each group of stored numbers, each display means having a plurality of names, each name of a group corresponding to one number stored in a corresponding group of stored telephone numbers, said display means comprising a plurality of first and second strips having names written thereon, said first and second strips being oriented at substantially right angles with respect to each other along their lengths, said first and second strips adapted to fit between the rows of said selection buttons, the names of each of said first and second strips being arranged so that each name on a strip is aligned with a column formed by said buttons,
   each name being observed also being immediately adjacent to the selection button corresponding to the telephone number corresponding to the name,
   switching means having a first and second switching condition for selecting one of said first and second groups of stored telephone numbers corresponding to a selected strip, said switching means comprising a manually operable switch to selectively connect said number selection buttons to said first group of telephone numbers in response to said first switching condition and to said second group of telephone numbers in response to said second switching condition,
   the telephone number provided by said number storing means whose said switching means is in said first switching condition corresponding to the telephone number of the name immediately adjacent thereto on said plurality of first strips, and the telephone number provided by said storing means whose said switching means is in said second switching condition corresponding to the telephone number of the name immediately adjacent thereto on said plurality of second strips,
   means for automatically dialing the stored telephone number in each group of stored numbers corresponding to a name of a selected one of said first and second group of names in response to the activation of a number selection button immediately adjacent to and associated with said name,
   whereby the actuation of a number selection button will cause the telephone number corresponding to said switch condition and to said immediately adjacent name to be dialed.

2. Apparatus for indexing the repertory buttons of a telephone repertory dialer comprising:
   a plurality of telephone number selection buttons arranged in rows and columns,
   means for storing a plurality of groups of a plurality of telephone numbers, one number of each group of said plurality of telephone numbers corresponding to a particular selection button,
   a plrality of means for displaying groups of names corresponding to each group of stored numbers, each display means having a plurality of names, each name of a group corresponding to one number stored in a corresponding group of stored telephone numbers,
   said name display means further comprising
   a plurality of rotatable multi-sided supports, extending in the row direction of said selection buttons, each support being located immediately adjacent to and along a row of selection buttons,
   means for simultaneously rotating each support of said plurality so that corresponding faces of each support face in the same direction even when rotated,
   a plurality of name strips, each being attached to a face of said supports,
   said strips having spaced names, each name immediately adjacent to a corresponding selection button of the row to which said support is adjacent, the names of corresponding faces of said supports forming a plurality of groups of names, each group of names corresponding to a group of telephone numbers,
   means for selecting one of said multi-sided supports to cause the names of the selected group of names thereon to be observable, each name being observed also being immediately adjacent to the selection button corresponding to the telephone number corresponding to the name,
   switching means to select the group of said telephone numbers corresponding to the group of names on said strips at a prescribed location provided by the rotation of said supports, said prescribed location being that location where all the name strips of a group are exposed between said rows of selection buttons,
   means for automatically dialing the stored telephone number in each group of stored numbers corresponding to a name of a selected group of names in response to the activation of a number selection button immediately adjacent to and associated with said name,
   whereby the actuation of a selection button corresponding to a name causes the telephone number corresponding to the name associated therewith on said selected number group to be automatically dialed by said automatic dialing means.

3. The apparatus of claim 2 wherein
   said switching means for selecting one of said of plurality of groups of stored telephone numbers is responsive to the rotation of said supports.

4. The apparatus of claim 2 wherein said rotatable support comprises
   a shaft, at least one plate for rotatably mounting said shaft,
   a multi-sided support extending along and supported by said shaft, a rack and a plurality of pinions, each of said pinions being fixed to a different shaft, a support plate for slidably supporting said rack, a lever attached to said rack and adapted to move said rack in its longitudinal direction to thereby rotate said pinions and the supports attached thereto, means for securing said lever at fixed locations, said fixed locations being such that a different side of said support is visible between said rows of buttons at these fixed locations, said switching means comprises a plurality of switches, a different switch being closed at each different lever fixed location, said switches being connected between said stored number groups and said automatic dialing means to connect a different group of stored telephone numbers corresponding to the names appearing between said rows of buttons at each different fixed lever location.

5. Apparatus for indexing the repertory buttons of a telephone repertory dialer comprising:

a plurality of telephone number selection buttons arranged in rows and columns, means for storing a plurality of groups of a plurality of telephone numbers, one number of each group of said plurality of telephone numbers corresponding to a particular selection button, a plurality of means for displaying groups of names corresponding to each group of stored numbers, each display means having a plurality of names, each name of a group corresponding to one number stored in a corresponding group of stored telephone numbers, said name displaying means further comprising, a plurality of rotatable two-sided support strips extending immediately adjacent to and along said rows of buttons, each row of buttons having its own plurality of rotatable strips, each strip of said plurality being adapted to rotate through substantially 90° with respect to the strips which are in the form of a pile below the rotated strip, each strip having a plurality of names thereon equal in number to the columns of selection buttons, each name being immediately adjacent to a button in each respective row, said names being attached to said strip on the top and bottom surface of said strip, each name on said plurality of strips being immediately adjacent to and associated with a button on the row of buttons to which the strips are adjacent, corresponding strips in each of said plurality of strips between said rows of buttons forming layers of strips, means for simultaneously selectively rotating a layer of strips to cause the names of the selected group of names to be observable, each name being observed also being immediately adjacent to the selection button corresponding to the telephone number corresponding to the name, switching means to select the group of numbers in said telephone number storing means corresponding to the group of names on top and bottom surfaces on the selected layer of strips, means for automatically dialing the stored telephone number in each group of stored numbers corresponding to a name of a selected group of names in response to the activation of a number selection button immediately adjacent to and associated with said name, whereby the actuation of a selected button corresponding to a name immediately adjacent thereto on said strip will cause the telephone number corresponding to that name to be automatically dialed.

6. The apparatus of claim 5 comprising in addition said means for simultaneously selectively rotating a layer of strips comprises a first and second rotating means, each of which will rotate the same layer of strips, each group of names on each surface of a layer of strips corresponding to each group of numbers in said number storing means, switching means responsive to said first and second rotating means to select the group of numbers in said number storing means corresponding to the group of names on the selected layer of strips and the group of names on the adjacent layer of strips in acccordance with the selection of the first and second rotating means, respectively, the actuation of a selection button corresponding to a name in proximity thereto on the rotated strip will cause the telephone number corresponding to that name to be automatically dialed when said first rotating means has been selected, and the actuation of a selection button corresponding to a name in proximity to the adjacent non-rotated strip will cause the telephone number corresponding to the name in the non-rotated strip to be automatically dialed when said second rotating means has been selected.

7. The apparatus of claim 6 comprising in addition a plurality of shafts each rigidly supporting one of said strip supports, a plurality of tabs, one of each rigidly fixed to each shaft and hence to each strip, the tabs attached to the strips of a layer having the same longitudinal position along each shaft, the tabs for each layer of strips occupying a different position along the shaft from the tabs of every other layer of strips, a plurality of rods, each rod adapted to engage only the tabs of one layer of strips when moved longitudinally and to thereby rotate said one layer of strips and all other layers on top of said one layer, a plurality of switches, each rod when moved longitudinally to rotate the said one layer of strips also engages a switch associated with said rod, each of said switches being connected to a group of telephone numbers in a memory corresponding to the layer of strips operated associated with each switch, said engagement of said switch by said rod causes the automatic dialing mechanism to be connected to the selected telephone number group and to cause an actuated selection button to automatically dial a corresponding number from the selected group of numbers.

8. Apparatus for indexing the repertory buttons of a telephone repertory dialer comprising:

a plurality of telephone number selection buttons arranged in rows and columns, means for storing a plurality of groups of a plurality of telephone numbers, one number of each group of said plurality of telephone numbers corresponding to a particular selection button, a plurality of sheets for displaying groups of names corresponding to each group of stored numbers, each sheet having an array of perforations in the form of rows and columns corresponding to the rows and columns of said selection buttons, each sheet having a plurality of names, each name on a sheet being immediately adjacent to one of said protruding selection buttons and corresponding to one number stored in a corresponding group of stored telephone numbers, each sheet further being capable of being directly manually rotated, means for supporting one of said sheets which has been selectively rotated at a position at least 90° from its position when in the pile of sheets so as to cause the names of the selected group of names on the topmost sheet of the remaining pile of sheets to be observable, each name being observed also being immediately adjacent to the selection button corresponding to the telephone number corresponding to the name, switching means responsive to a selectively rotated sheet for selecting one of said plurality of groups of stored telephone numbers corresponding to the group of names on said topmost sheet, means for automatically dialing the stored telephone number in each group of stored numbers corresponding to a name of a selected group of names in response to the activation of a number selection button immediately adjacent to and associated with said name, whereby when a selected sheet has been rotated and mechanically positioned so that the names contained on said topmost sheet are visible, the actuation of a number selection button will cause the telephone number corresponding to said immediately adjacent name to be dialed.

9. The apparatus of claim 8 wherein each of said plurality of sheets of names has a projecting portion, said switching means comprises a plurality of electrical switches, each sheet when moved to its supported position activates a different one of said switches by switch contact with its said projecting portion, said switches being serialy connected between said group of stored telephone numbers in said number storage means and to said automatic dialing mechanism, actuation of a selected button providing the number of the name in proximity to said button as presented on the topmost sheet of said pile.

* * * * *